US012560203B2

(12) United States Patent
Bang et al.

(10) Patent No.: US 12,560,203 B2
(45) Date of Patent: Feb. 24, 2026

(54) HYDRO-DEFLECTOR SEALING SYSTEM FOR A BEARING UNIT

(71) Applicant: AKTIEBOLAGET SKF, Gothenburg (SE)

(72) Inventors: Nilesh Bang, Pune (IN); Yash Patil, Dhule (IN); Kapil Chaudhary, Ghaziabad (IN); Gianpiero Scaltriti, Turin (IT); Gopal Kamble, Pune (IN)

(73) Assignee: Aktiebolaget, SKF, Gothenburg (SE)

( * ) Notice: Subject to any disclaimer, the term of this patent is extended or adjusted under 35 U.S.C. 154(b) by 51 days.

(21) Appl. No.: 18/387,084

(22) Filed: Nov. 6, 2023

(65) Prior Publication Data

US 2024/0159273 A1 May 16, 2024

(30) Foreign Application Priority Data

Nov. 11, 2022 (IT) ......................... 102022000023277

(51) Int. Cl.
F16C 33/78 (2006.01)

(52) U.S. Cl.
CPC ...... F16C 33/7866 (2013.01); F16C 33/7823 (2013.01); F16C 33/7863 (2013.01); F16C 33/7896 (2013.01)

(58) Field of Classification Search
CPC .............. F16C 33/7823; F16C 33/7859; F16C 33/7863; F16C 33/7866; F16C 33/7896
See application file for complete search history.

(56) References Cited

U.S. PATENT DOCUMENTS

| | | | | |
|---|---|---|---|---|
| 5,042,822 A | * | 8/1991 | Dreschmann ....... | F16C 33/7896 277/424 |
| 6,042,272 A | * | 3/2000 | Nagase ............... | F16C 33/7896 384/486 |

(Continued)

FOREIGN PATENT DOCUMENTS

| | | | | |
|---|---|---|---|---|
| CN | | 200999862 | | 1/2008 |
| CN | | 200999862 Y | * | 1/2008 |

(Continued)

OTHER PUBLICATIONS

Machine Translation of JP-2003004057-A (Year: 2003).*

(Continued)

*Primary Examiner* — Alan B Waits
(74) *Attorney, Agent, or Firm* — Stinson LLP

(57) ABSTRACT

A bearing unit includes two hydro-deflector sealing systems, each positioned on opposite axial ends of the bearing unit. Each hydro-deflector sealing system includes an external seal having a first radially outer lip, a second radially outer lip, and a radially inner anchoring lip formed at an opposite end. An angled connecting portion connects the second radially outer lip to an intermediate portion that extends to the radially inner anchoring lip. At least two ridges are formed on the intermediate portion. The first and second radially outer lips and the angled connecting portion define a W-shaped groove that deflect contaminants away. The hydro-deflector sealing system also has an internal seal having a primary lip, an anchoring lip formed, an intermediate portion connecting the primary lip and the anchoring lip, and a secondary lip toward the external seal that does not contact the external seal under normal operating conditions.

20 Claims, 9 Drawing Sheets

(56)         References Cited

U.S. PATENT DOCUMENTS 6,065,879 A * 5/2000 Mitsue ................. F16C 41/007
                                                                277/565
8,585,296 B2 * 11/2013 Yamaguchi ......... F16C 33/7853
                                                                384/477

FOREIGN PATENT DOCUMENTS

| CN | 103573830 | 2/2014 | |
| CN | 217328157 | 8/2022 | |
| JP | H08159164 | 6/1996 | |
| JP | 2003004057 A * | 1/2003 | .......... F16C 33/7846 |
| JP | 2003148497 | 5/2003 | |
| JP | 2009156274 | 7/2009 | |
| JP | 2019206990 A * | 12/2019 | .......... F16C 33/7863 |

OTHER PUBLICATIONS

Machine Translation of CN-200999862-Y (Year: 2008).*
Machine Translation of JP-2019206990-A (Year: 2019).*
International Search Report for corresponding Italy Patent Appln.
No. 102022000023277 dated Apr. 28, 2023.

* cited by examiner

HYDRO-DEFLECTOR SEALING SYSTEM FOR A BEARING UNIT

CROSS-REFERENCE TO RELATED APPLICATIONS

This application is based on and claims priority to Italy Patent Application No. 102022000023277 filed Nov. 11, 2022, under 35 U.S.C. § 119, the disclosure of which is incorporated by reference herein.

FIELD

The present disclosure relates to a seal for a bearing unit and more particularly to a hydro-deflector sealing system for a bearing unit.

BACKGROUND

Bearing units are often subjected to conditions that introduce external contaminants, such as mud, water, dirt, and sand. Seals or sealing devices are used to protect the interior of the bearing unit and its components from these contaminants that can damage the components of the bearing unit, cause corrosion, and reduce the working life of the bearing unit.

SUMMARY

Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, a hydro-deflector bearing unit comprises a stationary radially outer ring, a rotatable radially inner ring, a plurality of rolling elements interposed between the inner ring and the outer ring, and two hydro-deflector sealing systems, each positioned on opposite axial ends of the bearing unit. Each hydro-deflector sealing system comprises an axially external seal, which in turn comprises a first radially outer lip formed at a first radial end of the external seal, a second radially outer lip positioned radially inner relative to the first radially outer lip, where the first and second radially outer lips define between them a first recces, a radially inner anchoring lip formed at a second radial end of the external seal distal to the first radial end, and an intermediate portion connecting the first radial end and the second radial end. The intermediate portion of the external seal comprises at least two ridges formed on the intermediate portion and projecting axially outward therefrom, wherein the first and second radially outer lips define a W-shaped groove. Each sealing system also includes an axially internal seal, which in turn comprises a primary lip formed at a radially inner end of the internal seal and a secondary lip extending radially outward toward the external seal. A gap is defined between a distal end of the secondary lip and the external seal, and a V-shaped recess is defined between the secondary lip and the internal seal.

According to at least one non-limiting exemplary embodiment, the anchoring lip of the external seal is received within an anchoring groove formed on a radially outer surface of the inner ring.

According to at least one non-limiting exemplary embodiment, the centrifugal forces caused by rotation of the external seal during use cause the first and second radially outer lips and the connecting portion to repel external contaminants away from the external seal.

According to at least one non-limiting exemplary embodiment, the secondary lip is flexible and configured to flex under weight of contaminants and make contact with an inner axial surface of the external seal.

According to at least one non-limiting exemplary embodiment, the at least two ridges are two in number, and wherein the centrifugal forces caused by rotation of the external seal during use cause a first ridge of the two ridges to direct external contaminants along a path radially inward from the first ridge to a second ridge and away from the external seal.

According to at least one non-limiting exemplary embodiment, the first recess comprises an angle of 60° and the second recess comprises an angle of between 65° and 80°.

According to at least one non-limiting exemplary embodiment, the external seal further comprises a metal flinger.

According to at least one non-limiting exemplary embodiments, the sealing system is configured to adjust to a misalignment of up to 1° and is further configured to prevent ingress of external contaminants when misaligned.

DETAILED DESCRIPTION

When a bearing unit is mounted on a drive shaft, e.g., a drive shaft of a vehicle, the drive shaft can transmit torque from the engine to the wheel by means of a rotating shaft placed below the chassis frame of the engine. Often, when the engine is placed above the wheel, i.e., at a higher level than the wheel, the drive shaft can be misaligned. This misalignment can result in failure of the drive shaft, the bearing unit, any components of the bearing unit, such as a seal of the bearing unit, and of any coupling between elements.

When the bearing unit is fixed to the chassis frame of the engine, it is frequently exposed to severe contamination conditions, which includes exposure to mud, water, dust, sand, and other external contaminants. The bearing unit can also become misaligned during installation or operation, so it is desirable for the bearing unit to be able to withstand dynamic and static operating conditions, in which the drive shaft is misaligned, without failing. As such, a bearing unit with a sealing component that effectively protects the interior of the bearing unit that can also operate in a misaligned operating condition is desirable.

Known sealing devices, such as those illustrated in FIGS. 1A-1D, are designed to accommodate one or the other, but not both. For example, existing solutions use rubber contact seals such as RS1 or RSH seal designs, or an arrangement that uses a combination of two contact seals or two non-contact seals. However, these solutions fail to provide a satisfactory seal while also withstanding misalignments of a drive shaft.

It is therefore an object of the present disclosure to provide a seal for a bearing unit for a drive shaft which can accommodate misalignment of the drive shaft and prevent ingress of contaminants into the interior of the bearing unit even under severe conditions and to contaminants such as mud, water, dust, and sand.

Figure 1A:
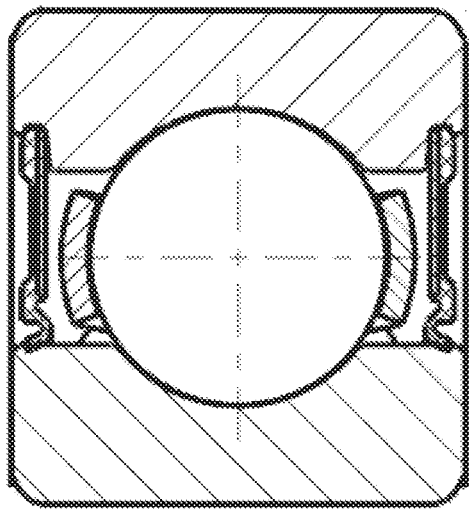
FIGS. 1A-1D illustrate sealing configurations according to conventional technological solutions.
Figure 1B:
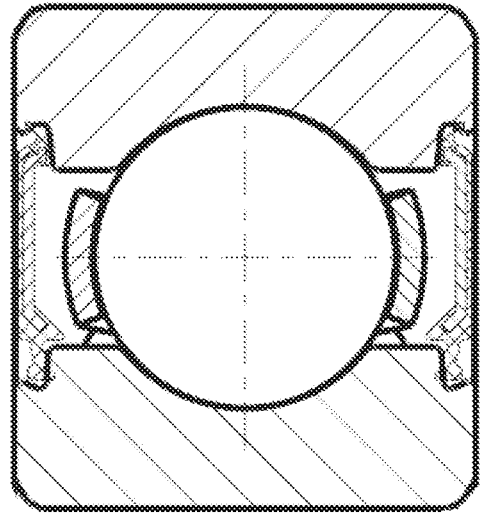
Figure 1C:
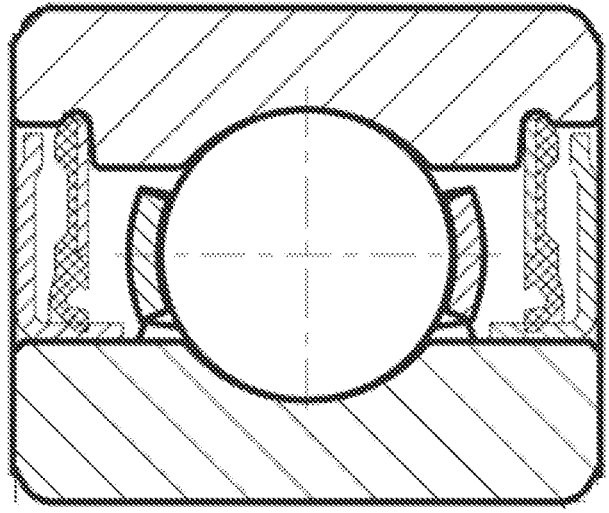
Figure 1D:
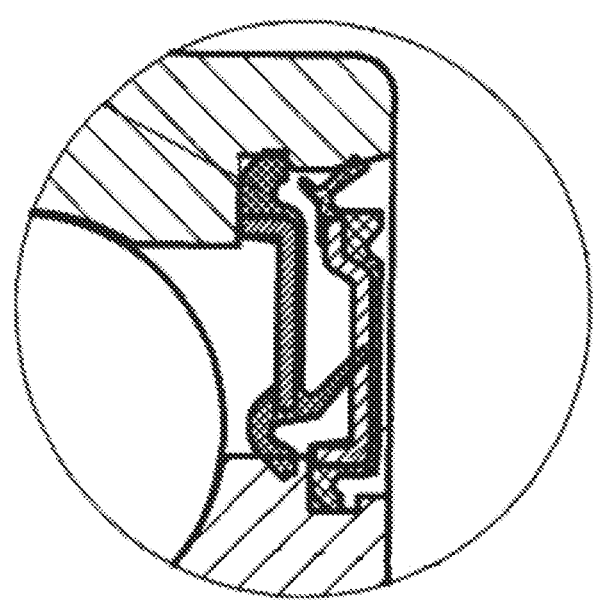
Figure 2A:
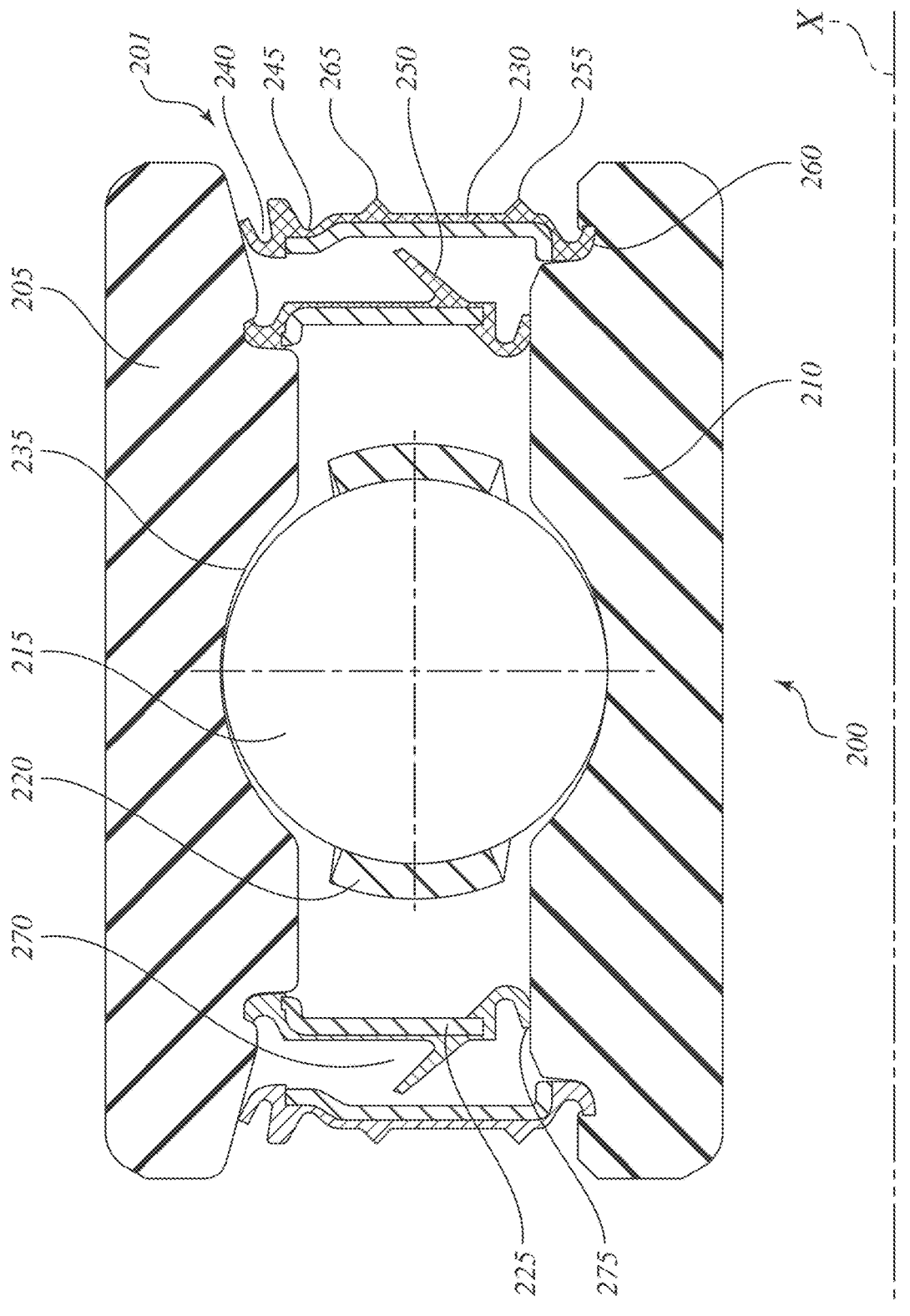
FIG. 2A illustrates a cross section of a bearing unit with a hydro-deflector sealing system according to exemplary embodiments of the present disclosure.
Figure 2B:
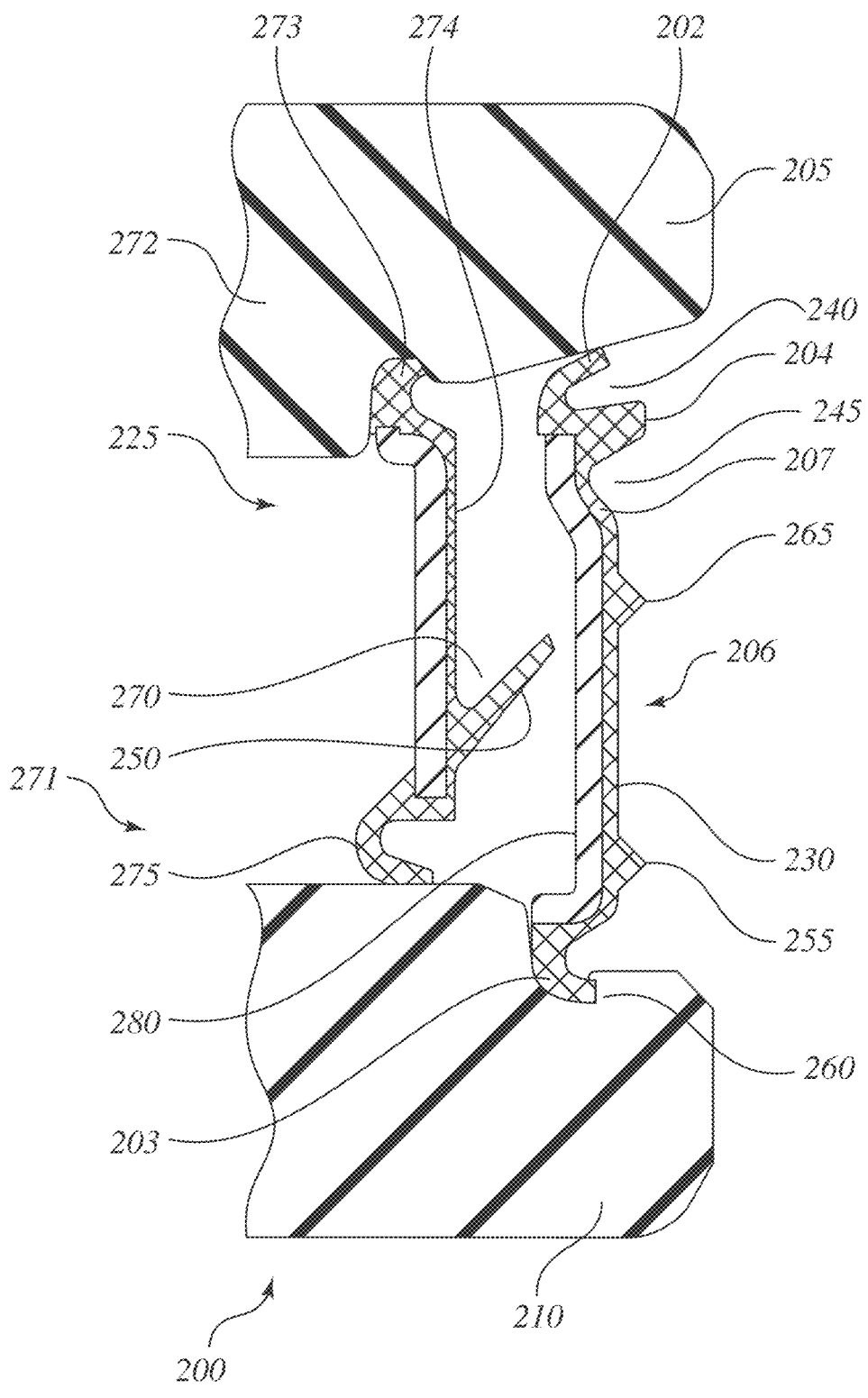
FIG. 2B illustrates in an enlarged view, the hydro-deflector sealing system of the bearing unit of FIG. 2A according to exemplary embodiments of the present disclosure.

FIG. 2A and FIG. 2B illustrate a bearing unit having a hydro-deflector sealing system that overcomes the afore-mentioned drawbacks of known solutions in accordance with exemplary embodiments of the present disclosure. In some embodiments, a bearing unit 200 may include a radially outer ring 205, a radially inner ring 210, and a plurality of rolling elements 215 interposed between outer ring 205 and inner ring 210. Rolling elements 215 may roll along raceways 325 of outer ring 205 and inner ring 210 to facilitate relative movement of outer ring 205 and inner ring 210. Bearing unit 200 may further include two hydro-deflector sealing systems 201, one housed on either axial end of bearing unit 200, that seal an interior of bearing unit 200 from an external environment. In some embodiments, a cage 220 may hold rolling elements 215 in place. As illustrated in FIGS. 2A and 2B, inner ring 210 rotates and outer ring 205 is stationary. However, a person of ordinary skill in the art will appreciate that, in alternative embodiments, outer ring 205 may rotate and inner ring 210 may be stationary without departing from the scope of the disclosure. In such alterna-tive embodiments in which outer ring 205 rotates and inner ring 210 is stationary, the following description of a sealing system may be reversed such that external seal 230 is fixed to the rotating outer ring and internal seal 225 is fixed to stationary inner ring 210.

Throughout this disclosure and in the claims, the terms and the expressions indicating positions and orientations such as "radial" and "axial" are understood as being in relation to central axis of rotation X of bearing unit 200.

In some embodiments, each hydro-deflector sealing sys-tem 201 may include an axially external seal 230. In some embodiments, external seal 230 may include a first radially outer lip 202 positioned at a radially outer end of external seal 230 distal to a radially inner anchoring lip 203. Outer lip 202 may be configured to contact a radially inner surface of outer ring 205 when sealing system 201 is assembled in bearing unit 200. In some embodiments, radially inner anchoring lip 203 may be received within a sealing groove 260 formed in a radially outer surface of inner ring 210 to secure external seal 230 to inner ring 210 and to ensure proper positioning of external seal 230 during installation. A first recess 240 open axially outward at an acute angle may be defined at the radially outer end of external seal 230 between outer lip 202 and a second radially outer lip 204 that projects axially outward and is radially inner relative to first radially outer lip 202. A second recess may also be defined between second radially outer lip 204 and a connecting portion 207 connecting second radially outer lip 204 with an intermediate portion 206 of external seal 230. Intermediate portion 206 in turn may connect connecting portion 207 with anchoring lip 203. In some embodiments, external seal 230 be formed by a metal flinger 280 onto which each of the forgoing components is molded.

In some embodiments, connecting portion 207 may be angled radially with respect to intermediate portion 206 such that a W-shaped groove is defined by first and second radially outer lips 202 and 204, first and second recesses 240 and 245, and connecting portion 207. Due to the centrifugal forces generated during rotation of external seal 230 during use, the W-shaped groove is able to break-up and repel contaminants (e.g., water, mud, sand, etc.) from the external environment to prevent them from entering the interior of bearing unit 200. In order to maximize the destructive and repulsive effects of the W-shaped groove on external con-taminants, an angle of first recess 240 may be approximately 60° and an angle of second recess 245 may be between 65° and 80°.

In some embodiments, external seal 230 may include at least two extruded molded ridges, e.g., ridges 255 and 265, formed along intermediate portion 206. Ridges 255 and 265 may have a substantially triangular-shaped radial cross section extending from intermediate portion 206 in an axially outward direction. Ridges 255 and 265 help to disrupt flow of external contaminants on an outer axial surface of external seal 230 and improve the repulsive effect of external seal 230 in re-directing external contaminants away from the interior of bearing unit 200.

Figure 3:
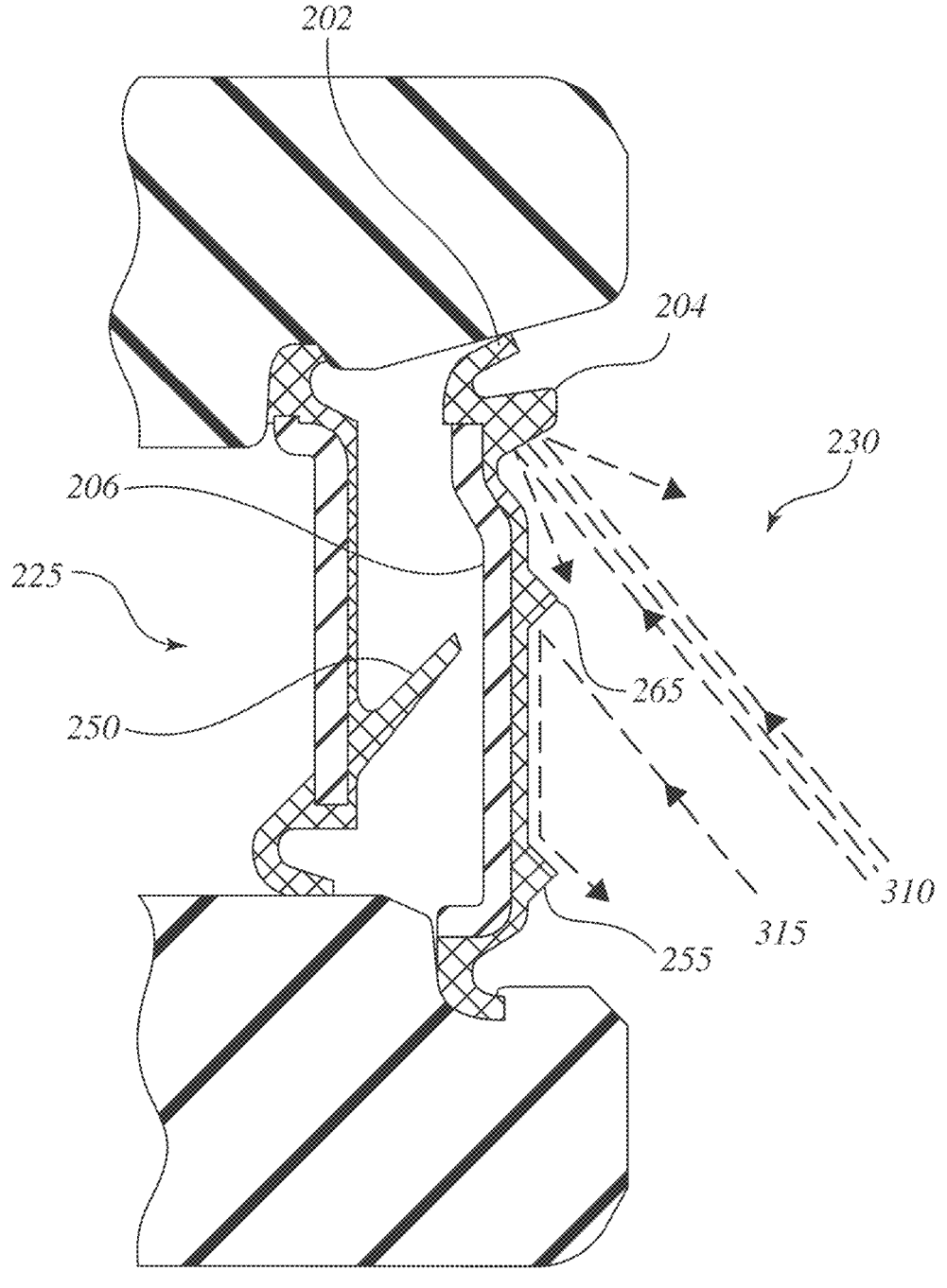
FIG. 3 illustrates a cross section of a hydro-deflector sealing system of a bearing unit deflecting external contaminants according to exemplary embodiments of the present disclosure.

FIG. 3 illustrates an exemplary embodiment of the repel-lent effect of external seal 230. As depicted in FIG. 3, in some embodiments, second radially outer lip 204 may deflect a stream of contaminants 310 and split/break-up stream of contaminants 310. Ridges 255 and 265 may also divert contaminants 315 away from the interior of bearing unit 200 by re-directing contaminants 315 from ridge 265, along the outer surface of intermediate portion 206, off ridge 255, and away from external seal 230. In addition, second radially outer lip 204 may protect first radially outer lip 202 from contaminants by deflecting them, as well as by reduc-ing the speed of contaminants, which reduces the likelihood of contaminants entering the interior of bearing unit 200.

In some embodiments, hydro-deflector sealing system 201 may further include an internal seal 225 positioned axially internal to external seal 230 when sealing system is assembled in bearing unit 200. Internal seal 225 may include a flexible primary lip 275 formed at a radially inner end 271 of internal seal 225 and a secondary lip 250 projecting axially and radially outward from internal seal 225. An intermediate portion 274 may connect primary lip 275 with a radially outer lip 273 at a radially outer end 272 distal to primary lip 275. In some embodiments, intermediate portion 272 and secondary lip 250 may define between them a V-shaped recess 270.

When bearing unit 200 is aligned, primary lip 250 does not contact external seal 230, and a gap exists between external seal 230 and primary lip 250. This improvement reduces friction torque that external seal 230 experiences during use, improving the working life of external seal 230. At the same time, primary lip 250 provides protection against ingress of contaminants that are able to pass through first radially outer lip 202 to space between internal seal 225 and external seal 230. Contaminants that enter at first radially outer lip 202 enter V-shaped recess 270 and are blocked by secondary lip 250, which prevents contaminants from traveling in the radially inward direction toward pri-mary lip 275 of internal seal 225. Secondary lip 270 is further configured to bend due to the pressure from contaminants toward metal flinger 280 and make contact with an inner axial surface thereof. Thus, when external seal 230 fails to prevent ingress of contaminants, secondary lip 270 of internal seal 225 may form a contact seal with external seal 230 to protect the interior of bearing unit 200. This, of course, coming with the tradeoff of contacting metal flinger 280 and increasing the friction torque on external lip 230. However, this increase in friction torque only occurs during failure of first axially outer lip 202, at which point protecting the interior of bearing unit 200 is paramount over protecting external seal 230 from damage.

Figure 4A:
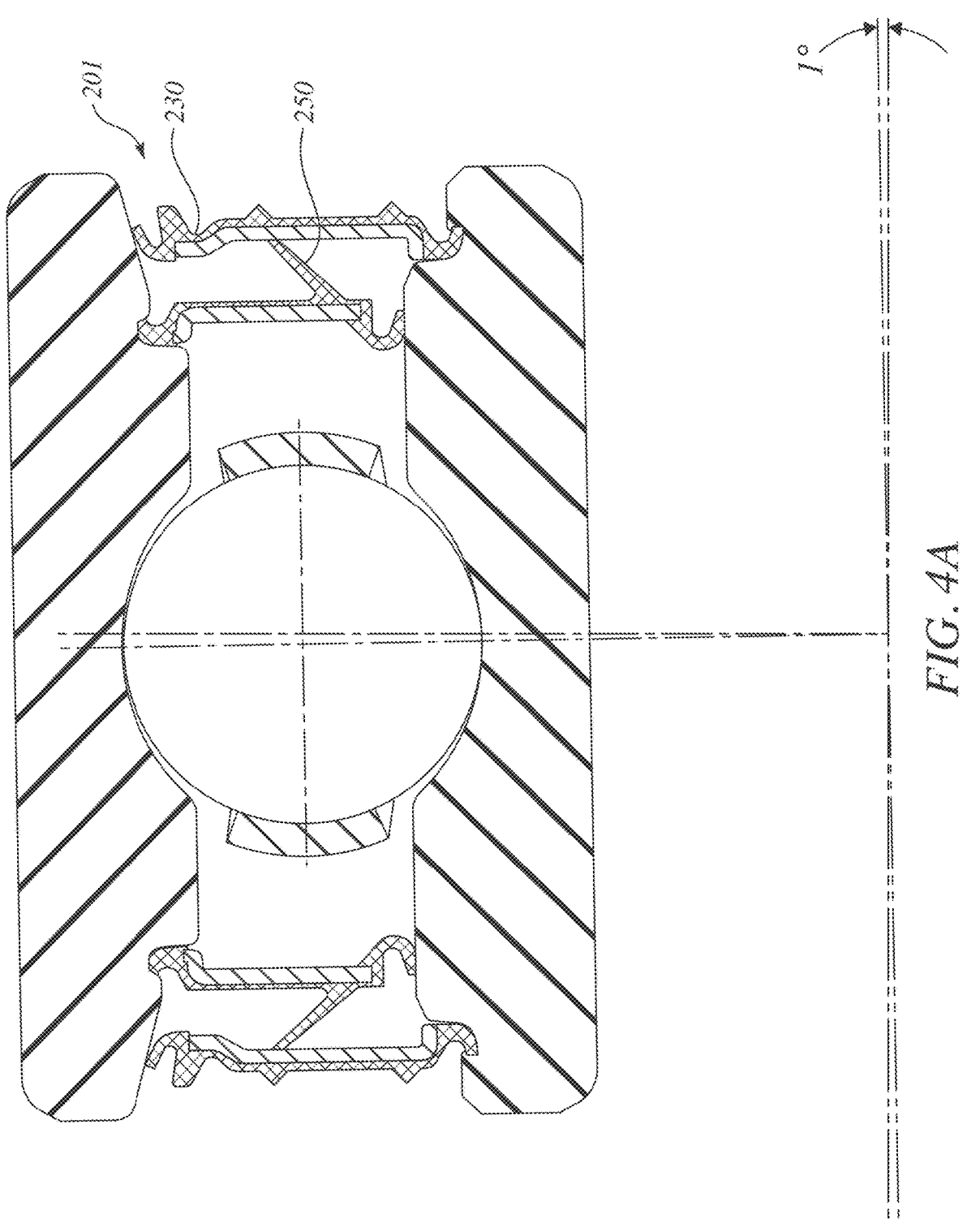
FIG. 4A illustrates a cross section of a hydro-deflector sealing system of a bearing unit in a misaligned condition according to exemplary embodiments of the present disclosure.

In addition to the advantages to the prevention of ingress of contaminants into the interior of bearing unit 200 and to the reduction of friction torque to external seal 230, hydro-deflector sealing system 201 has a further advantage of operating even when bearing unit 200 is misaligned. In some embodiments, as illustrated in FIG. 4A, bearing unit 200 may be misaligned from the drive shaft by up to 1° and, due to the gap between secondary lip 250 and external seal 230 in an aligned configuration, secondary lip 250 may be in contact with external seal 230. Under such conditions, hydro-deflector sealing system 201 may still provide effective sealing for the interior of bearing unit 200 despite this misalignment, even though the contact between secondary lip 250 may lead to increased friction torque on external seal 230.

Figure 4B:
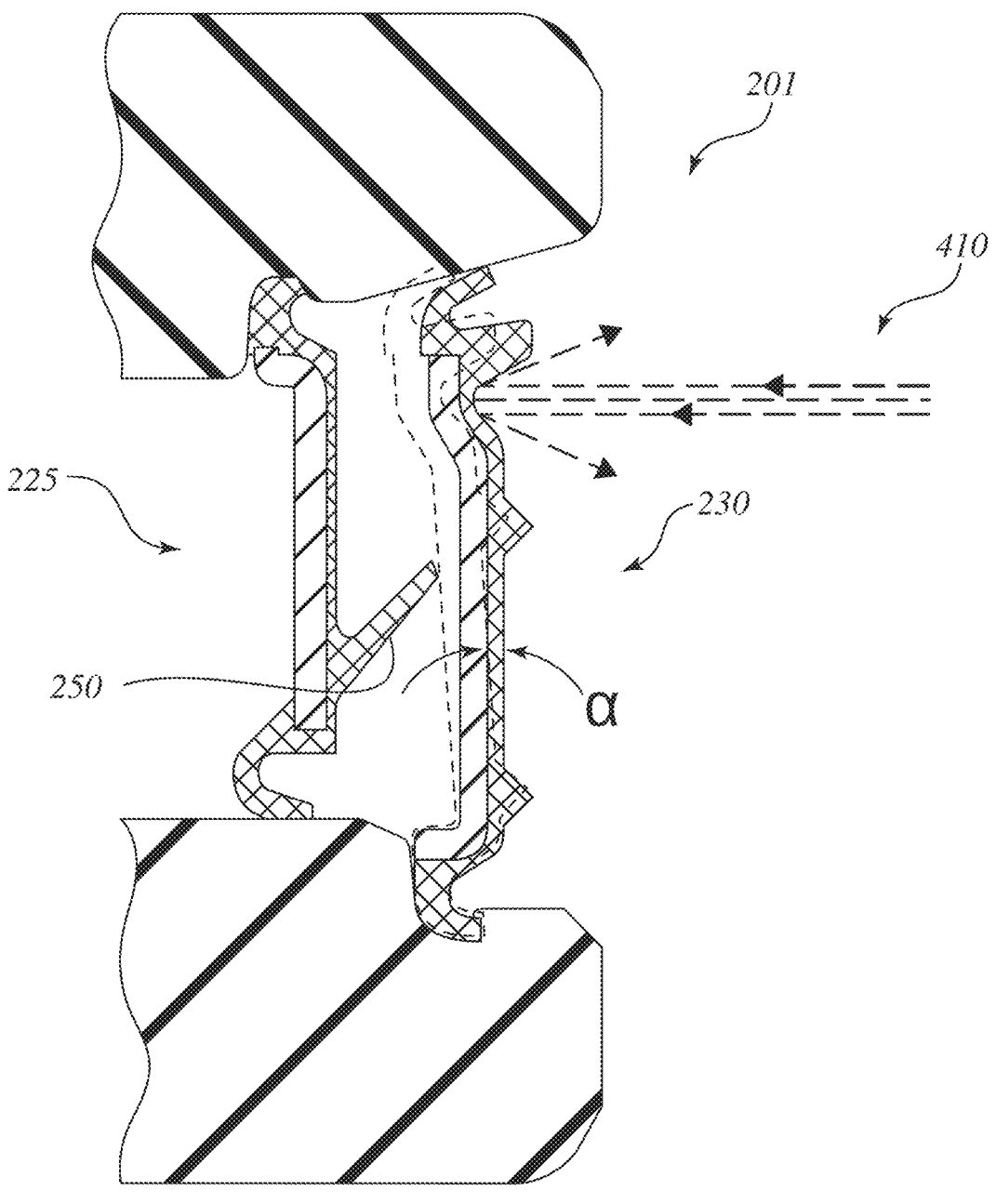
FIG. 4B illustrates effects of a hydro-deflector sealing system of a bearing unit deflecting external contaminants according to exemplary embodiments of the present disclosure.
Figure 5:
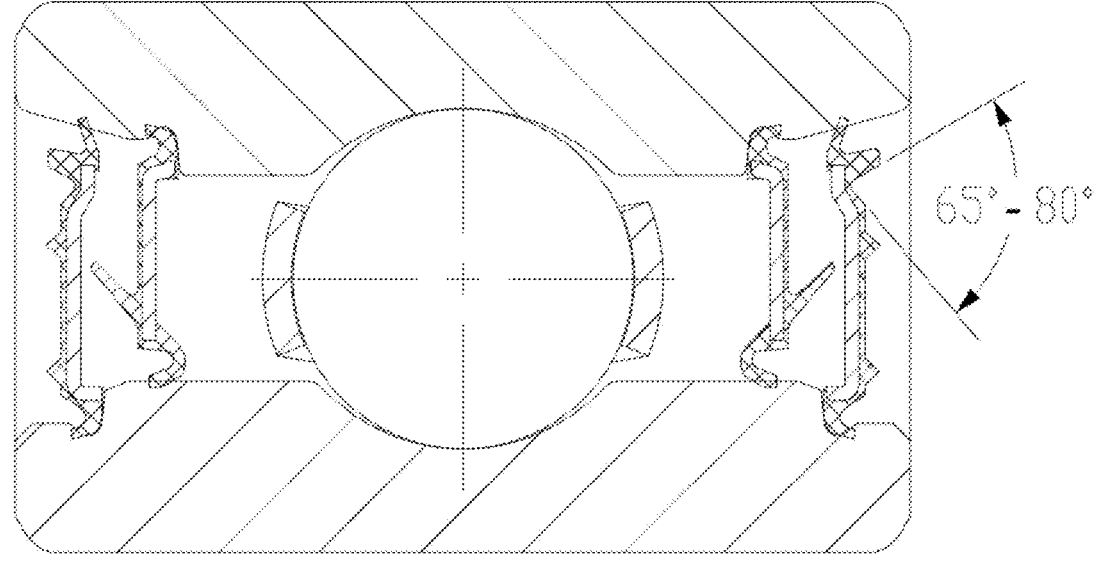
FIG. 5 illustrates a cross section of a hydro-deflector sealing system of a bearing unit according to exemplary embodiments of the present disclosure.

In some embodiments, inward pressure caused by external contaminants 410 contacting external seal 230 may be large enough to displace external seal 230 inward. However, as illustrated in FIG. 4B, due to the gap between secondary lip 250 of internal seal 225 and external seal 230 in an assembled configuration, the inward displacement, represented as a, merely causes external seal 230 to fill in that gap and make contact with secondary lip 250. This improves the sealing effect of hydro-deflector sealing system 201 under these extreme conditions when the chances of failure of external seal 230 increase and ingress of contaminants into the interior of bearing unit 200 is more likely.

In addition to the embodiments of the disclosure described herein, it is to be understood that numerous further variants exist. It is also to be understood that said embodiments are only examples and do not limit the scope of the disclosure, its applications, or its possible configurations. On the contrary, although the description provided above enables the person skilled in the art to implement the present disclosure in at least one embodiment, it is to be understood that numerous variations of the components described are feasible without thereby departing from the scope of the disclosure, as defined in the accompanying claims, interpreted literally or in accordance with their legal equivalents.

It should be noted that the use of particular terminology when describing certain features or embodiments of the disclosure should not be taken to imply that the terminology is being re-defined herein to be restricted to include any specific characteristics of the features or embodiments of the disclosure with which that terminology is associated. Terms and phrases used in this disclosure, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as"

should be interpreted as "such as, without limitation"; the term "includes" should be interpreted as "includes but is not limited to"; the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

We claim:
1. A hydro-deflector bearing unit comprising:
a stationary radially outer ring;
a rotatable radially inner ring;
a plurality of rolling elements interposed between the inner ring and the outer ring; and
two hydro-deflector sealing systems, each positioned on opposite axial ends of the bearing unit, wherein each hydro-deflector sealing system comprises:
an axially external seal comprising:
a first radially outer lip formed at a first radial end of the external seal;
a second radially outer lip positioned radially inner relative to the first radially outer lip, wherein the first and second radially outer lips define a first recess between the first and second radially outer lips;
a radially inner anchoring lip formed at a second radial end of the external seal distal to the first radial end;
an intermediate portion connecting the first radial end and the second radial end; and
at least two ridges formed on the intermediate portion and projecting axially outward therefrom,
wherein the first and second radially outer lips define a W-shaped groove; and an axially internal seal comprising:

a primary lip formed at a radially inner end of the internal seal; and a secondary lip extending radially outward toward the external seal, wherein a gap is defined between a distal end of the secondary lip and the external seal, and a V-shaped recess is defined between the secondary lip and the internal seal.

2. The hydro-deflector bearing unit of claim 1, wherein the anchoring lip of the external seal is received within an anchoring groove formed on a radially outer surface of the inner ring.

3. The hydro-deflector bearing seal as claimed in claim 1, wherein the first and second radially outer lips are configured to repel external contaminants away from the external seal due to centrifugal forces caused by rotation of the external seal during use.

4. The hydro-deflector bearing unit of claim 1, wherein the secondary lip is flexible and configured to flex under weight of contaminants and make contact with an inner axial surface of the external seal.

5. The hydro-deflector bearing unit of claim 1, wherein the at least two ridges are two in number, and wherein the centrifugal forces caused by rotation of the external seal during use cause a first ridge of the two ridges to direct external contaminants along a path radially inward from the first ridge to a second ridge and away from the external seal.

6. The hydro-deflector bearing unit of claim 1, wherein the second radially outer lip defines a second recess, wherein the first recess comprises an angle of 60° and the second recess comprises an angle of between 65° and 80°.

7. The hydro-deflector bearing unit of claim 1, wherein the external seal further comprises a metal flinger.

8. The hydro-deflector bearing unit of claim 1, wherein the secondary lip of the internal seal is arranged relative to the external seal to prevent ingress of external contaminants when the sealing system is misaligned up to 1°.

9. The hydro-deflector bearing unit of claim 1, wherein the intermediate portion has an inner radial end and an outer radial end, one of the at least two ridges being adjacent the outer radial end of the intermediate portion and another of the at least two ridges being adjacent the inner radial end of the intermediate portion.

10. The hydro-deflector bearing unit of claim 1, wherein the intermediate portion includes an axially outer surface, wherein the second radially outer lip extends axially outward of the axially outer surface of the intermediate portion.

11. A hydro-deflector sealing system for a bearing unit, the hydro-deflector sealing system comprising:

a first seal comprising:

a first lip formed at a first end of the first seal;

a second lip adjacent the first lip, wherein the first and second lips define a first recess between the first and second lips;

an anchoring lip formed at a second end of the external seal distal to the first end;

an intermediate portion connecting the first end and the second end; and at least two ridges formed on a first surface of the external seal at the intermediate portion, wherein the first and second radially outer lips define a W-shaped groove; and a second seal comprising:

a primary lip formed at a first end of the second seal;

a secondary lip extending toward a second surface of the external seal opposite the first surface, wherein a gap is defined between a distal end of the secondary lip and the second surface of the first seal, and wherein a V-shaped recess is defined between the secondary lip and the second seal.

12. The hydro-deflector sealing system of claim 11, wherein the secondary lip is flexible and configured to flex under weight of contaminants and make contact with the second surface of the first seal.

13. The hydro-deflector sealing system of claim 11, wherein the second lip defines a second recess, wherein the first recess comprises an angle of 60° and the second recess comprises an angle of between 65° and 80°.

14. The hydro-deflector sealing system of claim 11, wherein the first seal further comprises a metal flinger.

15. The hydro-deflector sealing system of claim 11, wherein the anchoring lip of the first seal is configured to be received within a groove formed on a radially outer surface of a radially inner ring of the bearing unit when the hydro-deflector sealing system is assembled in the bearing unit.

16. The hydro-deflector sealing system of claim 11, wherein the first and second lips are configured to repel external contaminants away from an interior of the bearing unit when the hydro-deflector sealing system is assembled in the bearing unit.

17. The hydro-deflector sealing system of claim 11, wherein the at least two ridges are two in number and are configured to direct external contaminants along a path from a first ridge to a second ridge and away from an interior of the bearing unit when the hydro-deflector sealing system is assembled in the bearing unit.

18. The hydro-deflector sealing system of claim 11, wherein the secondary lip of the second seal is arranged relative to the first seal to prevent ingress of external contaminants when the sealing system is misaligned up to 1°.

19. The hydro-deflector sealing system of claim 11, wherein the intermediate portion has an inner radial end and an outer radial end, one of the at least two ridges being adjacent the outer radial end of the intermediate portion and another of the at least two ridges being adjacent the inner radial end of the intermediate portion.

20. The hydro-deflector sealing system of claim 11, wherein the intermediate portion includes an axially outer surface, wherein the second lip extends axially outward of the axially outer surface of the intermediate portion.

* * * * *